(12) United States Patent
Buzak et al.

(10) Patent No.: US 6,614,410 B2
(45) Date of Patent: Sep. 2, 2003

(54) METHOD OF OPERATING A PLASMA ADDRESSED LIQUID CRYSTAL DISPLAY DEVICE TO REDUCE SPUTTERING

(75) Inventors: Thomas S. Buzak, Beaverton, OR (US); Kevin J. Ilcisin, Beaverton, OR (US)

(73) Assignee: Tektronix, Inc., Beaverton, OH (US)

( * ) Notice: Subject to any disclaimer, the term of this patent is extended or adjusted under 35 U.S.C. 154(b) by 172 days.

(21) Appl. No.: 09/843,359

(22) Filed: Apr. 25, 2001

(65) Prior Publication Data

US 2001/0040544 A1 Nov. 15, 2001

Related U.S. Application Data

(60) Provisional application No. 60/203,976, filed on May 12, 2000.

(51) Int. Cl.[7] ................................................. G09G 3/10
(52) U.S. Cl. ............................. 345/37; 345/60; 349/32; 315/169.4
(58) Field of Search ..................... 345/60, 37; 313/581, 313/582, 483; 315/169.4; 349/32

(56) References Cited

U.S. PATENT DOCUMENTS

| | | | | |
|---|---|---|---|---|
| 5,408,245 A | * | 4/1995 | Kakizaki | 345/60 |
| 5,694,183 A | * | 12/1997 | Ilcisin et al. | 349/32 |
| 5,705,886 A | * | 1/1998 | Bongaerts et al. | 313/483 |
| 5,838,398 A | * | 11/1998 | Ilcisin et al. | 349/32 |
| 6,400,078 B1 | * | 6/2002 | Van Bommel et al. | 313/582 |
| 6,411,030 B1 | * | 6/2002 | Van Leeuwen et al. | 313/582 |
| 6,411,345 B1 | * | 6/2002 | Yano et al. | 349/32 |
| 6,448,946 B1 | * | 9/2002 | Anderson et al. | 345/60 |
| 6,479,945 B2 | * | 11/2002 | Buzak et al. | 315/169.4 |

* cited by examiner

Primary Examiner—Steven Saras
Assistant Examiner—Fritz Alphonse
(74) Attorney, Agent, or Firm—John D. Winkelman; John Smith-Hill

(57) ABSTRACT

A PALC panel is operated by driving a channel electrode to a positive voltage relative to the data drive electrode to initiate an AC discharge in the channel and thereafter maintaining a sufficient voltage between the channel electrodes to sustain a DC discharge in the channel.

13 Claims, 3 Drawing Sheets

METHOD OF OPERATING A PLASMA ADDRESSED LIQUID CRYSTAL DISPLAY DEVICE TO REDUCE SPUTTERING

CROSS REFERENCED TO RELATED APPLICATIONS

This application claims the benefit of U.S. Provisional Application No. 60/203,976, filed May 12, 2000.

BACKGROUND OF THE INVENTION

This invention relates to a method of operating a plasma addressed liquid crystal (PALC) device to reduce sputtering.

U.S. Pat. No. 5,077,553 discloses apparatus for addressing data storage elements. A practical implementation of the apparatus shown in U.S. Pat. No. 5,077,553 is illustrated schematically in FIG. 1 of the accompanying drawings.

The display panel shown in FIG. 1 comprises, in sequence from below, a polarizer 2, a channel member 4, a cover sheet 6 (commonly known as a microsheet), a layer 10 of electro-optic material, an array of parallel transparent data drive electrodes (only one of which, designated 12, can be seen in the view shown in FIG. 1), an upper substrate 14 carrying the data drive electrodes, and an upper polarizer 16. In the case of a color display panel, the panel includes color filters (not shown) between the layer 10 and the upper substrate 14. The panel may also include layers for improving viewing angle and for other purposes. The channel member 4 is typically made of glass and is formed with multiple parallel channels 20 in its upper main face. The channels 20, which are separated by ribs 22, are filled with an ionizable gas, such as helium. An anode 24 and a cathode 26 are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the lower and upper polarizers 2 and 16. The region of the upper surface of the display panel that bounds the panel element constitutes a single pixel 30 of the display panel.

When the anode 24 in one of the channels is connected to a reference potential and a suitably more negative voltage is applied to the cathode 26 in that channel, the gas in the channel forms a plasma which provides a conductive path to the reference potential at the lower surface of the cover sheet 6. If a data drive electrode is at the reference potential, there is no significant electric field in the volume element of electro-optic material in the panel element at the crossing of the channel and the data drive electrode and the panel element is considered to be off, whereas if the data drive electrode is at a substantially different potential from the reference potential, there is a substantial electric field in that volume element of electro-optic material and the panel element is considered to be on.

It will be assumed in the following description, without intending to limit the scope of the claims, that the lower polarizer 2 is a linear polarizer and that its plane of polarization can be arbitrarily designated as being at 0° relative to a reference plane, that the upper polarizer 16 is a linear polarizer having its plane of polarization at 90°, and that the electro-optic material rotates the plane of polarization of linearly polarized light passing therethrough by an angle which is a function of the electric field in the electro-optic material. When the panel element is off, the angle of rotation is 90°; and when the panel element is on, the angle of rotation is zero.

The panel is illuminated from the underside by an extended light source 34 which emits unpolarized white light. A rear glass diffuser 18 having a scattering surface may be positioned between the light source and the panel in order to provide uniform illumination of the panel. The light that enters a given panel element from the source is linearly polarized at 0° by the lower polarizer 2 and passes sequentially through the channel member 4, the channel 20, the cover sheet 6, and the volume element of the electro-optic material toward the upper polarizer 16 and a viewer 32. If the panel element is off, the plane of polarization of linearly polarized light passing through the volume element of electro-optic material is rotated through 90°, and therefore the plane of polarization of light incident on the upper polarizer element is at 90°. The light is passed by the upper polarizer element and the pixel is illuminated. If, on the other hand, the panel element is on, the plane of polarization of the linearly polarized light is not changed on passing through the volume element of electro-optic material. The plane of polarization of light incident on the upper polarizer element is at 0° and therefore the light is blocked by the upper polarizer element and the pixel is dark. If the electric field in the volume element of electro-optic material is intermediate the values associated with the panel element being off and on, light is passed by the upper polarizer element with an intensity which depends on the electric field, allowing a gray scale to be displayed.

In a practical implementation of the PALC display panel, the channel member 4 is etched back around the area in which the channels are formed in order to provide a plateau 36 in which the channels 20 are formed, and the cover sheet 6 is secured to the channel member by an endless frit bead 38 in a rabbet 40 extending around the periphery of the plateau. An upper substrate assembly, including the upper substrate 14 and the data drive electrodes 12 carried thereby, is attached to the channel member 4 by means of a glue bead 42.

The voltages that are applied to the cathode and the data drive electrodes typically vary in accordance with the waveforms shown in FIG. 2. The anode 24 (waveform A) is held at a reference potential level, which may be ground. To write data in a single line, the data drive electrodes (waveform B) are driven so that there is a voltage difference of up to about 80 volts between each data drive electrodes and the anode 24. The actual voltage to which a given data drive electrode is driven depends on the desired gray scale level of the pixel at the crossing of the data drive electrode and the channel. Generally, the polarity of the voltage applied to the data drive electrodes alternates on successive frames to eliminate DC offset effects in the liquid crystal. The cathode 26 (waveform C) is driven to a negative firing voltage $V_f$, which is typically in the range −150 to −500 volts in order to initiate a discharge in the channel, and is then held at a negative sustain voltage $V_s$, which is typically less negative than the firing voltage. Finally, the cathode returns to ground and the discharge is extinguished.

During operation of a PALC panel having the structure described with reference to FIG. 1, the cathode 26 is subject to sputtering by the positive ions of the plasma. Sputtering can degrade performance of the PALC panel because the particles that are sputtered from the cathode are deposited on the interior surface of the channel and on the underside of the cover sheet and may reduce the transmissivity of the panel and hence its contrast during operation.

It is believed that sputtering is most severe immediately after the discharge has been initiated but before the voltage difference between the channel electrodes has been reduced to the sustain voltage because the potential difference between the anode and the cathode is at a maximum and therefore the charged particles striking the cathode are at their most energetic.

A discharge that is initiated in an ionizable gas between two electrodes that are both exposed to the gas is known as a DC discharge. A discharge can be initiated in an ionizable gas even if at least one of the electrodes is electrically insulated from the ionizable gas. Such a discharge is known as an AC discharge.

SUMMARY OF THE INVENTION

Modeling suggests that when the cathode of a PALC panel is driven to the firing voltage, first of all a discharge occurs in the vicinity of the underside of the cover sheet, and that the DC discharge between the anode and cathode occurs only subsequently. It is believed that the discharge that occurs in the vicinity of the underside of the cover sheet is an AC discharge between the cathode and the data drive electrodes. Thus, if the channel electrodes were appropriately driven, it would be possible to induce an AC discharge where the underside of the cover sheet is the cathode surface.

In accordance with a first aspect of the present invention there is provided an improved method of operating a PALC panel which comprises a channel member defining at least one channel, an ionizable gas in the channel, channel electrodes exposed to the ionizable gas in the channel, a cover sheet over the channel, a data drive electrode in crossing relationship with the channel and isolated from the channel by the cover sheet, and a layer of electro-optic material between the data drive electrode and the cover sheet, the method comprising initiating an AC discharge in the channel by driving at least one of the channel electrodes to a positive voltage relative to the data drive electrode, and thereafter maintaining a sufficient voltage between the channel electrodes to sustain a DC discharge in the channel.

In accordance with a second aspect of the present invention there is provided an improved PALC panel of the kind comprising a channel member defining at least one channel, an ionizable gas in the channel, channel electrodes exposed to the ionizable gas in the channel, a cover sheet over the channel, a data drive electrode in crossing relationship with the channel and isolated from the channel by the cover sheet, and a layer of electro-optic material between the data drive electrode and the cover sheet, wherein the improvement resides in a layer of transparent electron-emissive material on the underside of the cover sheet.

In accordance with a third aspect of the present invention there is provided an improved PALC panel of the kind comprising a channel member defining at least one channel, an ionizable gas in the channel, channel electrodes exposed to the ionizable gas in the channel, a cover sheet over the channel, a data drive electrode in crossing relationship with the channel and isolated from the channel by the cover sheet, and a channel electrode driver which drives at least one of the channel electrodes to a voltage such as to initiate a discharge in the channel, wherein the improvement resides in that the channel electrode driver drives at least one of the channel electrodes to a positive voltage relative to the data drive electrode, said positive voltage being of sufficient magnitude to initiate an AC discharge in the channel, and thereafter maintains a sufficient voltage between the channel electrodes to sustain a DC discharge in the channel.

In accordance with a fourth aspect of the present invention there is provided a PALC panel comprising a channel member defining at least one channel, an ionizable gas in the channel, channel electrodes exposed to the ionizable gas in the channel, a cover sheet over the channel, a data drive electrode in crossing relationship with the channel and isolated from the channel by the cover sheet, a layer of electro-optic material between the data drive electrode and the cover sheet, and a coating of transparent electron-emissive material on an interior surface of the channel.

In accordance with a fifth aspect of the present invention there is provided an improved PALC panel of the kind comprising a channel member defining at least one channel, an ionizable gas in the channel, channel electrodes exposed to the ionizable gas in the channel, a cover sheet over the channel, a data drive electrode in crossing relationship with the channel and isolated from the channel by the cover sheet, and a layer of electro-optic material between the data drive electrode and the cover sheet, wherein the improvement resides in that one of the channel electrodes is composed of a metal busbar extending longitudinally of the channel and a strip of transparent conductive material projecting laterally of the metal busbar.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals designate like or corresponding components.

In this specification, words of orientation and position, such as upper and lower, are used to establish orientation and position relative to the drawings and are not intended to be limiting in an absolute sense. Thus, a surface that is described as upper in the specification may correspond, in a practical implementation of the invention, to a lower surface or a vertical surface, which is neither upper nor lower.

DETAILED DESCRIPTION

Figure 1:
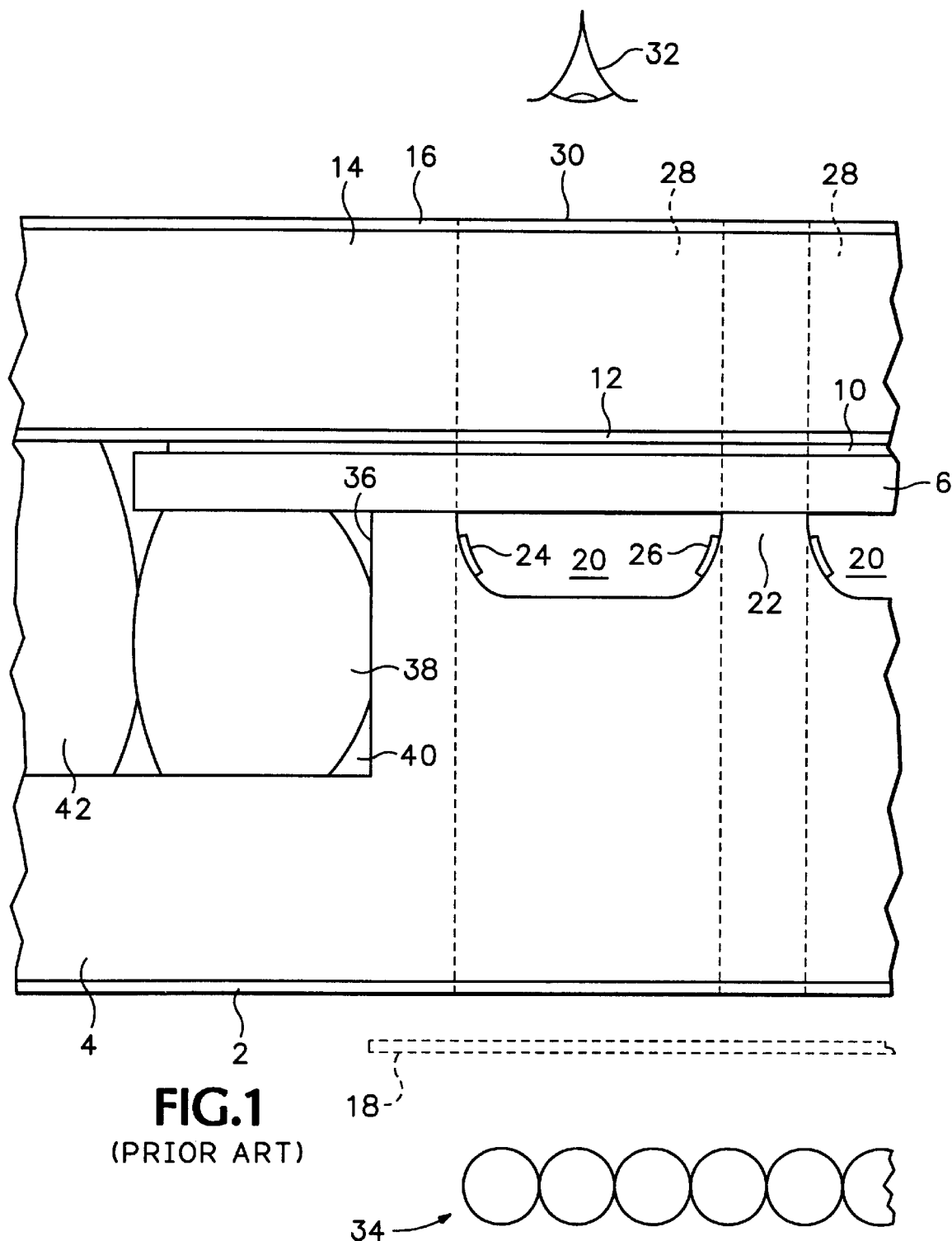
FIG. 1 is a partial sectional view of a PALC display panel in accordance with the prior art.
Figure 2:
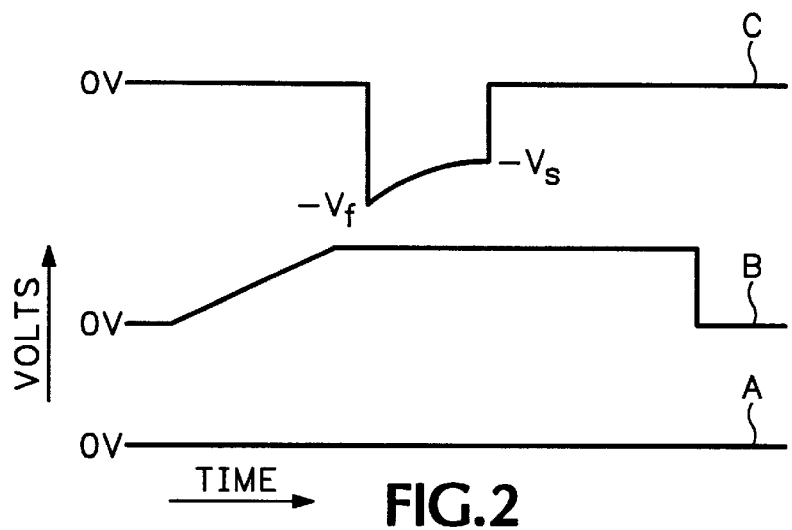
FIG. 2 is a graph illustrating voltage waveforms applied to the electrodes of a PALC display panel.
Figure 3:
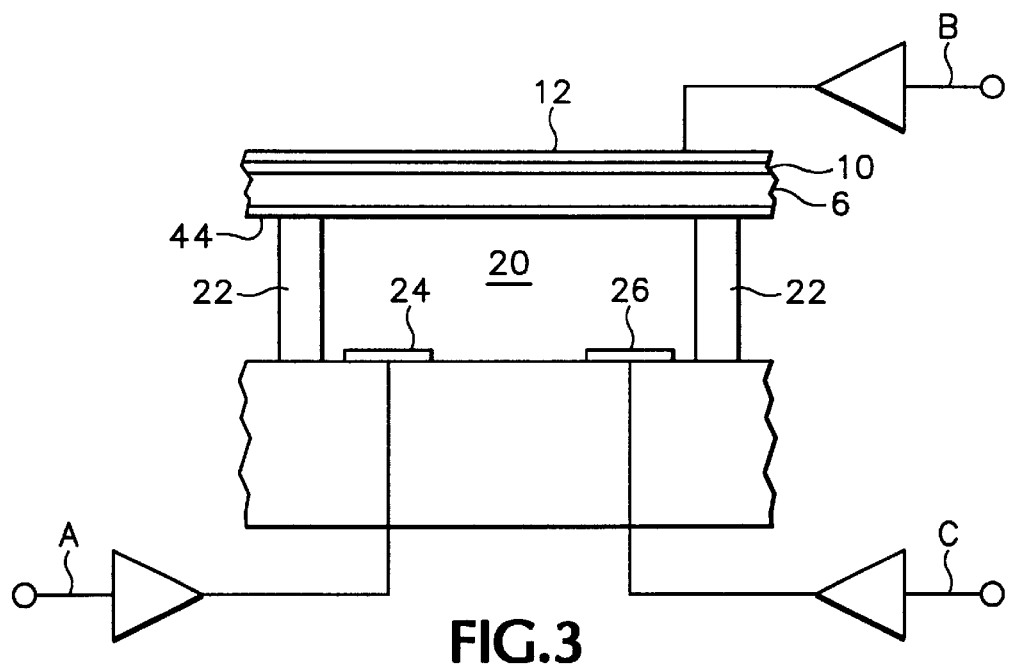
FIG. 3 is a partial sectional view of a PALC panel in accordance with the present invention.
Figures 4, 5:
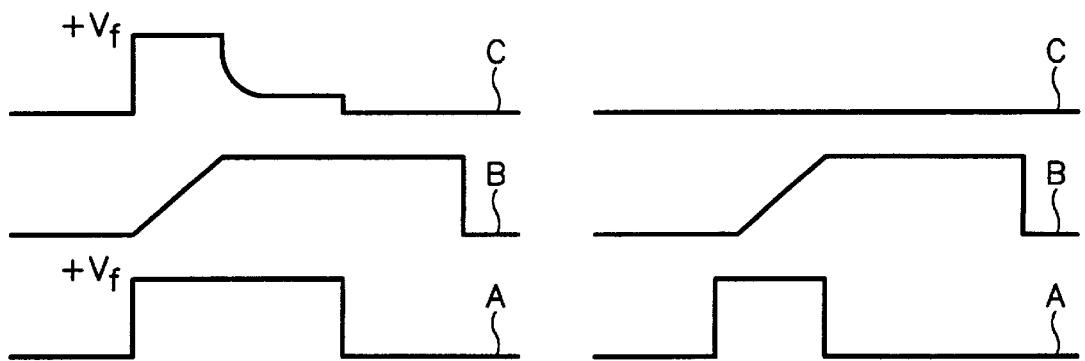
FIG. 4 is a graph of voltage waveforms applied to the electrodes of the PALC panel shown in FIG. 3.
FIG. 5 is a graph of waveforms applied to the PALC panel shown in FIG. 3 in accordance with a second embodiment of the invention.

Referring to FIGS. 3 and 4, the data drive electrode 12 is driven to a voltage up to about 80 volts from ground (positive and negative on alternate frames), as in the case of the conventional PALC panel. In accordance with the invention, the two channel electrodes 24, 26 are both driven positive with respect to the data drive electrode. The data drive electrode 12 then acts as a cathode and the two channel electrodes act as anodes and an AC discharge is initiated in the channel between the data drive electrode and the two channel electrodes. Shortly after the AC discharge has been initiated, the potential of the electrode 26 is reduced so that it is negative with respect to the electrode 24 and a DC discharge is sustained between the electrodes 24 and 26 as anode and cathode respectively. Finally, the electrodes 24, 26 are both grounded to extinguish the discharge while the data drive electrode is held at the appropriate voltage for writing the pixel to the desired state.

The data drive voltage is controlled so that it is at the correct value for the desired gray scale level, including transmission line effects, just before the plasma is extinguished.

By initiating the plasma using an AC discharge in which the data drive electrodes act as cathodes, sputtering from the channel electrodes is reduced.

It will be appreciated that each data drive electrode is driven to the voltage level appropriate for the gray scale level to be displayed by the pixel at the crossing of that data drive electrode and the channel. Generally, the gray scale level will vary along the channel and consequently the electric field between the data drive electrodes, as cathodes, and the channel electrodes, as anodes, will not be uniform along the channel. However, the positive firing voltage that is applied to the channel electrodes for initiating the AC discharge is sufficiently positive relative to the most positive voltage of the data drive electrodes that it will initiate the AC discharge reliably and the variation in electric field along the channel will not adversely affect creation of a uniform plasma in the channel.

It will be appreciated that if the channel electrodes are driven to the same positive firing voltage $V_f$ on each frame, the electric field in the channel will be higher for those frames in which the data drive voltage is negative than for those in which the data drive voltage is positive. Accordingly, on the frames in which the data drive voltage is negative, the AC discharge is initiated more rapidly than on the frames in which the data drive voltage is positive. Alternatively, the magnitude of the positive voltage applied to the channel electrodes may be varied on alternate frames so that the voltage difference remains the same.

It would be possible to drive all the data drive electrodes initially to the same voltage for initiation of the AC discharge and thereafter drive the data drive electrodes to the appropriate voltages selectively.

Preferably, the underside of the cover sheet 6 is provided with a coating 44 of a material which has a high coefficient of secondary emission, to reduce the potential required to initiate the AC discharge. Magnesium oxide is a favorable choice for this purpose because it is transparent and does not impair the transmissivity of the panel.

Modeling of the PALC panel suggests that both an AC discharge between the data drive electrodes and the channel electrodes and a DC discharge between the channel electrodes are initiated, but the AC discharge reduces the number of positive ions available to sputter the channel electrode. Further, the AC discharge is favored by the geometry of the electrodes and the presence of the MgO coating and this may reduce the potential difference between the channel electrodes for firing and therefore contribute to the reduction in sputtering.

In the conventional PALC panel, the anode 24 is grounded and only the cathode 26 is driven. This is favorable because it is not necessary to drive the anodes but merely hold them at ground. It will be appreciated that a disadvantage of the method described with reference to FIG. 4 is that the need for drivers for both channel electrodes adds to the cost of the panel. Referring to FIG. 5, the electrode 26 is held at ground and the electrode 24 is driven to the positive firing voltage $V_f$. The voltage difference between the electrode 24 and the data drive electrodes 12 is sufficient to initiate an AC discharge in the channel. The voltage between the channel electrodes is sufficient that once the AC discharge has been initiated, a DC discharge is sustained without need to increase the potential difference between the channel electrodes.

Figure 6:
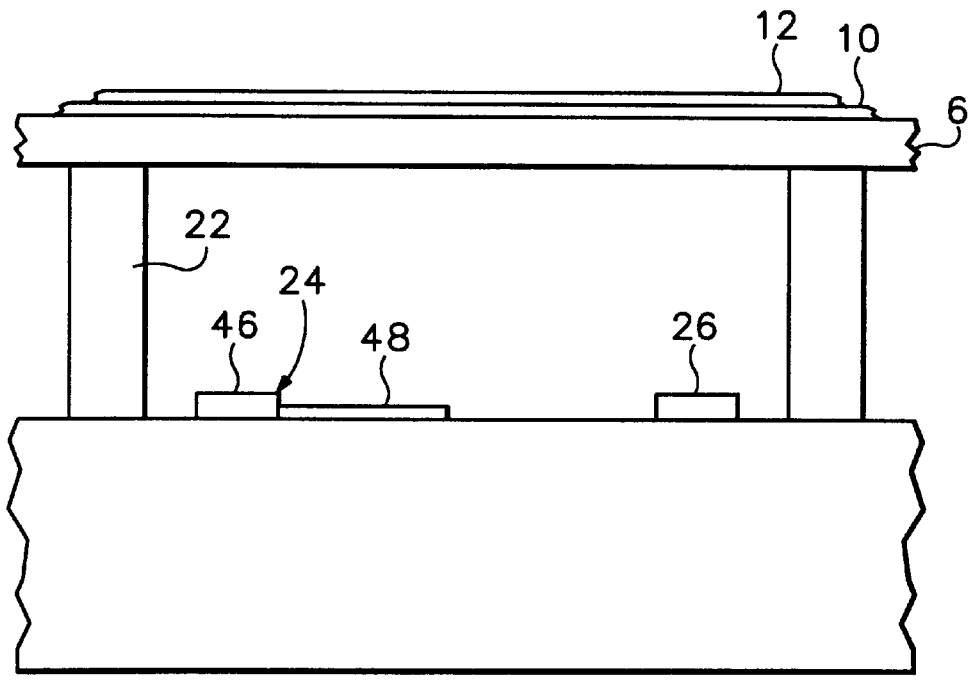
FIG. 6 is a partial sectional view of a second PALC panel in accordance with the present invention.

In the case of the method described with reference to FIG. 5, it may be desirable to increase the area of the electrode 24 in order to enlarge the volume in which the AC discharge occurs. The electrode 24 may be made of conventional materials, such as metal with a coating of a rare earth hexaboride, in which case it may be desirable to reduce the size of the electrode 26 so that the total area that is obscured by the channel electrodes is not increased. Alternatively, referring to FIG. 6, the electrode 24 may be composed of a metal busbar 46 and a strip 48 of transparent conductive material, such as indium tin oxide (ITO), electrically connected to the busbar and extending from the busbar towards the electrode 26. Although the ITO has lower conductivity than the metal busbar, its conductivity is sufficient to ensure a good AC discharge because the current density during the AC discharge is relatively low.

Figure 7:
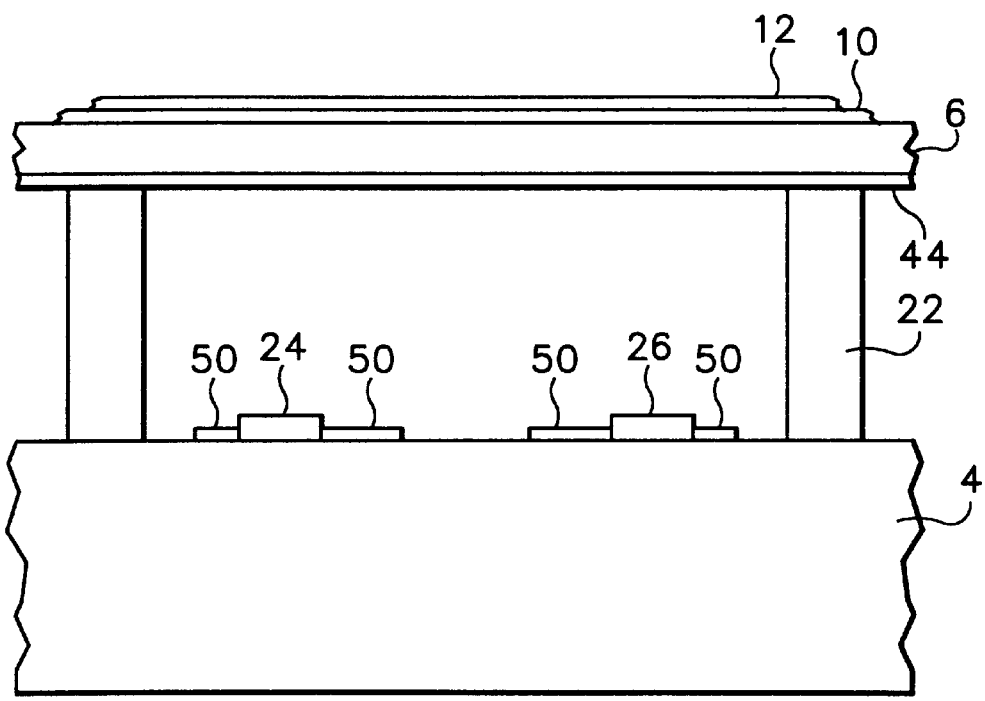
FIG. 7 is a partial sectional view of a third PALC panel in accordance with the present invention.

FIG. 7 illustrates a modification of the structure shown in FIG. 3. As shown in FIG. 7, there is a coating 44 of MgO on the underside of the cover sheet 6 and there is a coating 50 of MgO on the upper surface of the channel substrate in strips adjacent the channel electrodes. The purpose of the coating 50 is to minimize total degradation of the MgO on the cover sheet due to sputtering of either the channel electrode or adjacent surfaces. Although it is necessary only that the coating 50 be in strips adjacent the channel electrodes, process considerations may favor depositing the MgO on other interior surfaces of the channel also.

It will be appreciated that the invention is not restricted to the particular embodiment that has been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. An improved method of operating a PALC panel which comprises a channel member defining at least one channel, an ionizable gas in the channel, channel electrodes exposed to the ionizable gas in the channel, a cover sheet over the channel, a data drive electrode in crossing relationship with the channel and isolated from the channel by the cover sheet, and a layer of electro-optic material between the data drive electrode and the cover sheet, the method comprising initiating an AC discharge in the channel by driving at least one of the channel electrodes to a positive voltage relative to the data drive electrode, and thereafter maintaining a sufficient voltage between the channel electrodes to sustain a DC discharge in the channel.

2. A method according to claim 1, including initially driving both channel electrodes to a positive voltage relative to the data drive electrode and subsequently driving one of the channel electrodes to a less positive voltage.

3. A method according to claim 1, including holding one of the channel electrodes at a reference potential and varying the potential of the other channel electrode.

4. An improved PALC panel of the kind comprising a channel member defining at least one channel, an ionizable gas in the channel, channel electrodes exposed to the ionizable gas in the channel, a cover sheet over the channel, a data drive electrode in crossing relationship with the channel and isolated from the channel by the cover sheet, and a layer of electro-optic material between the data drive electrode and the cover sheet, wherein the improvement resides in a layer of transparent electron-emissive material on the underside of the cover sheet.

5. A PALC panel according to claim 4, wherein the electron emissive material is magnesium oxide.

6. A PALC panel according to claim 4, comprising a channel electrode driver which drives one of the channel electrodes to a positive firing voltage relative to the data drive electrode to initiate an AC discharge in the channel, reduces the voltage between the channel electrodes to a sustaining voltage to sustain the plasma for an interval during which a selected drive voltage is applied to the data drive electrode to establish an electric field in the layer of electro-optic material, and reduces the voltage between the channel electrodes to a level that is insufficient to sustain the plasma.

7. An improved PALC panel of the kind comprising a channel member defining at least one channel, an ionizable gas in the channel, channel electrodes exposed to the ionizable gas in the channel, a cover sheet over the channel, a data drive electrode in crossing relationship with the channel and isolated from the channel by the cover sheet, and a channel electrode driver which drives at least one of the channel electrodes to a voltage such as to initiate a discharge in the channel, wherein the improvement resides in that the channel electrode driver drives at least one of the channel electrodes to a positive voltage relative to the data drive electrode, said positive voltage being of sufficient magnitude to initiate an AC discharge in the channel, and thereafter maintains a sufficient voltage between the channel electrodes to sustain a DC discharge in the channel.

8. A PALC panel according to claim 7, wherein the channel electrode driver initially drives both channel electrodes to a positive voltage relative to the data drive electrode and subsequently drives one of the channel electrodes to a less positive voltage.

9. A PALC panel according to claim 7, wherein the channel electrode driver holds one of the channel electrodes at a reference potential and varies the potential of the other channel electrode.

10. A PALC panel comprising a channel member defining at least one channel, an ionizable gas in the channel, channel electrodes exposed to the ionizable gas in the channel, a cover sheet over the channel, a data drive electrode in crossing relationship with the channel and isolated from the channel by the cover sheet, a layer of electro-optic material between the data drive electrode and the cover sheet, and a coating of transparent electron-emissive material on an interior surface of the channel.

11. A PALC panel according to claim 10, wherein the coating is adjacent the channel electrodes.

12. An improved PALC panel of the kind comprising a channel member defining at least one channel, an ionizable gas in the channel, channel electrodes exposed to the ionizable gas in the channel, a cover sheet over the channel, a data drive electrode in crossing relationship with the channel and isolated from the channel by the cover sheet, and a layer of electro-optic material between the data drive electrode and the cover sheet, wherein the improvement resides in that one of the channel electrodes is composed of a metal busbar extending longitudinally of the channel and a strip of transparent conductive material projecting laterally of the metal busbar.

13. An improved PALC panel of the kind comprising a channel member defining at least one channel, an ionizable gas in the channel, channel electrodes exposed to the ionizable gas in the channel, a cover sheet over the channel, a data drive electrode in crossing relationship with the channel and isolated from the channel by the cover sheet, a layer of electro-optic material between the data drive electrode and the cover sheet, a layer of transparent electron-emissive material on the underside of the cover sheet, and a channel electrode driver which drives one of the channel electrodes to a positive firing voltage relative to the data drive electrode to initiate an AC discharge in the channel, then reduces the voltage between the channel electrodes to a sustaining voltage to sustain the plasma for an interval during which a selected drive voltage is applied to the data drive electrode to establish an electric field in the layer of electro-optic material, and and then reduces the voltage between the channel electrodes to a level that is insufficient to sustain the plasma.

* * * * *